United States Patent
Akhavan et al.

(10) Patent No.: US 12,547,361 B2
(45) Date of Patent: Feb. 10, 2026

(54) DRIVER OR OTHER VEHICLE OPERATOR ATTENTION RETARGETING

(71) Applicant: Faurecia IRYStec, Inc., Montreal (CA)

(72) Inventors: Tara Akhavan, Paris (FR); Hyunjin Yoo, Nepean (FR); Seungchul Ryu, Greenfield Pakr (CA); Jean Lorchat, Montreal (CA)

(73) Assignee: Faurecia IRYStec, Inc., Montreal (CA)

( * ) Notice: Subject to any disclaimer, the term of this patent is extended or adjusted under 35 U.S.C. 154(b) by 0 days.

(21) Appl. No.: 18/660,974

(22) Filed: May 10, 2024

(65) Prior Publication Data

US 2025/0348260 A1    Nov. 13, 2025

(51) Int. Cl.
   *G06F 3/14*    (2006.01)
   *G06F 3/01*    (2006.01)

(52) U.S. Cl.
   CPC .............. *G06F 3/14* (2013.01); *G06F 3/012* (2013.01); *G06F 3/013* (2013.01)

(58) Field of Classification Search
   CPC ............. G06F 3/14; G06F 3/012; G06F 3/013
   See application file for complete search history.

(56) References Cited

U.S. PATENT DOCUMENTS

| | | | | |
|---|---|---|---|---|
| 8,164,464 B2* | 4/2012 | Matos | ................... | A62B 99/00 |
| | | | | 702/182 |
| 8,629,784 B2* | 1/2014 | Szczerba | .............. | G01S 13/723 |
| | | | | 340/905 |
| 8,698,639 B2* | 4/2014 | Fung | ..................... | B60W 10/30 |
| | | | | 340/576 |
| 9,747,812 B2* | 8/2017 | Misu | ..................... | G09B 19/167 |
| 10,037,699 B1* | 7/2018 | Toyoda | .................. | G08G 1/166 |
| 10,083,605 B2* | 9/2018 | Sendhoff | ............... | B60W 50/08 |
| 12,210,679 B1* | 1/2025 | Watkins | ............... | G06V 10/462 |
| 2010/0253493 A1* | 10/2010 | Szczerba | ................ | G02B 27/01 |
| | | | | 345/593 |

(Continued)

FOREIGN PATENT DOCUMENTS

EP    2511121 B1    10/2018

OTHER PUBLICATIONS

Hou, Xiaodi, and Liqing Zhang. "Saliency Detection: A Spectral Residual Approach." 2007 IEEE Conference on Computer Vision and Pattern Recognition. IEEE, 2007.

(Continued)

*Primary Examiner* — Grant Sitta
(74) *Attorney, Agent, or Firm* — Reising Ethington P.C.

(57) ABSTRACT

A visual display output retargeting system and method, and visual display output control system having the visual display output retargeting system and implementing the method. The method includes: determining target driver attention data for a vehicle operator, wherein the target driver attention data indicates one or more target regions of a visual display output to be displayed to the vehicle operator; and determining visual display output data representing the visual display output as adjusted based on the target driver attention data for the vehicle operator through making adjustments to content of one or more retargeted regions of the visual display output so as to increase or decrease a likelihood of drawing the visual attention of the vehicle operator towards said retargeted region(s).

19 Claims, 2 Drawing Sheets

(56) References Cited

U.S. PATENT DOCUMENTS

| | | | |
|---|---|---|---|
| 2012/0200490 A1* | 8/2012 | Inada | B60R 11/04 |
| | | | 345/156 |
| 2012/0271484 A1* | 10/2012 | Feit | G01S 13/931 |
| | | | 701/1 |
| 2014/0204193 A1* | 7/2014 | Zhang | G06V 40/18 |
| | | | 348/78 |
| 2014/0210978 A1* | 7/2014 | Gunaratne | A61B 5/18 |
| | | | 348/77 |
| 2015/0086077 A1* | 3/2015 | Du | G06V 20/58 |
| | | | 382/104 |
| 2015/0169990 A1* | 6/2015 | Mclaughlin | G06T 7/20 |
| | | | 382/218 |
| 2015/0339589 A1* | 11/2015 | Fisher | G06V 10/454 |
| | | | 706/12 |
| 2019/0031027 A1* | 1/2019 | Pala | B60K 35/53 |
| 2021/0253111 A1* | 8/2021 | Iwase | G06V 20/597 |
| 2024/0242309 A1* | 7/2024 | Shi | G06T 3/4046 |
| 2024/0308516 A1* | 9/2024 | Seki | G06V 10/44 |
| 2025/0145168 A1* | 5/2025 | Kuwahara | B60W 50/10 |
| 2025/0216934 A1* | 7/2025 | Kim | G06V 20/46 |

OTHER PUBLICATIONS

S. Ryu, B. Ham and K. Sohn, "Contextual information based visual saliency model," 2013 IEEE International Conference on Image Processing, Melbourne, VIC, Australia, 2013, pp. 201-205, doi: 10.1109/ICIP.2013.6738042.

* cited by examiner

DRIVER OR OTHER VEHICLE OPERATOR ATTENTION RETARGETING

TECHNICAL FIELD

This invention relates to methods and systems for retargeting an attention of a driver or other operator of a vehicle, particularly retargeting visual attention of said driver through modifications to a visual display output of said vehicle.

BACKGROUND

More and more displays are being developed and introduced in vehicular applications, particularly automotive applications, to provide a better driving experience while effectively communicating more information to the driver. Such displays can provide useful information for driving performance and an enhanced user experience. However, a driver, pilot, or other vehicle operator often peers, glances, or otherwise looks at various visual display outputs generated by the vehicle, such as for checking instruments for the vehicle (e.g., speed, engine temperature), assess traffic or other elements of the vehicle's surroundings, to adjust climate control or entertainment information, to place a call, etc., and this may lead to safety issues.

SUMMARY

According to aspects of the disclosures, there is provided driver visual attention retargeting technology that aims to draw the attention of a driver or other vehicle operator ("vehicle operator"), namely the eyes of the vehicle operator, to particular content displayed on the screen. Although the description may, at various times, refer to the "driver," it will be appreciated that the teachings herein are applicable to any vehicle operator, unless expressly stated or indicated otherwise. As used herein, "vehicle operator" hereinafter refers to the driver or an individual responsible for the operation of the vehicle.

According to one aspect of the disclosure, there is provided a method of retargeting attention of a driver or other vehicle operator. The method includes: determining target driver attention data for a vehicle operator, wherein the target driver attention data indicates one or more target regions of a visual display output to be displayed to the vehicle operator, and wherein each target region of the one or more target regions is an area or region of the visual display output that includes content for which it is determined to increase or decrease drawing of visual attention of the vehicle operator towards; and determining visual display output data representing the visual display output as adjusted based on the target driver attention data for the vehicle operator, wherein determination of the visual display output data includes making adjustments to the visual display output by adjusting visual content of one or more retargeted regions of the visual display output so as to increase or decrease a likelihood of drawing the visual attention of the vehicle operator towards the one or more retargeted regions of the visual display output.

According to various embodiments, the method may further include any one of the following features or any technically-feasible combination of some or all of the features:

determining current driver attention data for the vehicle operator operating a vehicle based on one or both of: sensor data captured at the vehicle and saliency map data, and wherein the current driver attention data indicates an area or region of the visual display output to which the vehicle operator is currently attentive towards;

the visual display output data is adjusted based on the current driver attention data and the target driver attention data;

the saliency map data is determined based on initial visual display output data, and wherein the initial visual display output data is data representing the visual display output prior to the making of adjustments to the visual display output;

the initial visual display output data includes image data representing an image captured by a camera, and wherein the saliency map data is determined based on processing each of a plurality of image regions of the image based on the image data;

each image region of the plurality of image regions is assigned a saliency value based on contrast of the image region, edge information within the image region, hue distinctiveness of the image region, texture distinctiveness of the image region, and frequency components of the image region;

the current driver attention data is determined based on the sensor data, wherein the sensor data is data from a driver attention sensor installed on the vehicle and configured to capture the sensor data, and wherein the sensor data provides information pertaining to a state of the vehicle operator while the vehicle operator operates the vehicle;

the driver attention sensor is an infrared (IR) sensor configured to capture information indicative of a gaze direction of the vehicle operator;

the driver attention sensor is a device having an eye tracking sensor configured to capture eye information indicative of a gaze direction of the vehicle operator and/or a head tracking sensor configured to capture information indicative of a head position of the vehicle operator, and wherein the gaze direction of the vehicle operator is inferred or otherwise determined from the eye information and/or the head position of the vehicle operator;

the target driver attention data is determined based on predetermined target region data, and wherein the predetermined target region data indicates one or more regions of the visual display output that are targeted for increased or decreased driver attentiveness;

the one or more target regions includes one or more positive target regions, wherein the one or more positive target regions are each a region of the visual display output for which it is determined to increase drawing of the visual attention of the vehicle operator towards, and wherein the predetermined target region data includes positive target region data that indicates the one or more positive target regions of the visual display output;

the one or more target regions includes one or more negative target regions, wherein the one or more negative target regions are each a region of the visual display output for which it is determined to decrease drawing of the visual attention of the vehicle operator towards, and wherein the predetermined target region data includes negative target region data that indicates the one or more negative target regions of the visual display output;

the target driver attention data is determined based on sensor information captured by a sensor, and wherein the sensor information includes the sensor data or other sensor information;

the sensor information includes image data captured by a camera or infrared (IR) sensor, and wherein at least one target region of the one or more target regions is identified as an area of an image to be displayed where the area of the image is identified through correspondence between a position of the area as the area exists within the image and a position within a sensor field of view of the sensor corresponding to the position of the area;

the sensor information includes image data captured by a camera, wherein the image data is processed to detect one or more objects, and wherein the one or more objects are used to determine the target driver attention data;

the sensor information includes depth information of one or more objects, wherein the image data is processed to determine a distance for each of the one or more objects, and wherein the distance for each of the one or more objects is used to determine the target driver attention data; and/or determining the visual display output data includes generating an attention retargeting map based on the target driver attention data, wherein the attention retargeting map indicates the one or more retargeted regions with which to increase or decrease the visual attention of the vehicle operator, and wherein the one or more retargeted regions are determined based on the one or more target regions.

According to another aspect of the disclosure, there is provided a visual display output retargeting system comprising: at least one processor; and memory storing computer instructions that, when executed by the at least one processor, cause performance of a visual display output retargeting process that includes: determining target driver attention data for a vehicle operator, wherein the target driver attention data indicates one or more target regions of a visual display output to be displayed to the operator, and wherein each target region of the one or more target regions is an area or region of the visual display output that includes content for which it is determined to increase or decrease drawing of visual attention of the operator towards; and determining visual display output data representing the visual display output as adjusted based on the target driver attention data for the operator, wherein determination of the visual display output data includes making adjustments to the visual display output by adjusting visual content of one or more retargeted regions of the visual display output so as to increase or decrease a likelihood of drawing the visual attention of the operator towards the one or more retargeted regions of the visual display output.

According to various embodiments, the visual display output retargeting system may further be configured, through its computer instructions, to perform any one or more, or any technically-feasible combination of some or all, of the features enumerated above in connection with the method of retargeting attention of a driver or other vehicle operator.

According to another aspect of the disclosure, the visual display output retargeting system may be included as a part of a visual display output control system having a visual display configured to present visual display output for viewing by a driver or other vehicle operator. Furthermore, according to aspects of the disclosure, the visual display output control system may further comprise: a camera for capturing an input image used as initial visual display data, wherein the initial visual display data is used to determine current driver attention data; and/or a driver attention sensor for capturing the sensor data, wherein the current driver attention data is determined using the sensor data.

According to yet another embodiment, there is provided a method of retargeting attention of a driver or other vehicle operator. The method includes: determining target driver attention data for a vehicle operator, wherein the target driver attention data indicates one or more target regions of a visual display output to be displayed to the vehicle operator, and wherein each target region of the one or more target regions is an area or region of the visual display output that includes content for which it is determined to increase or decrease drawing of visual attention of the vehicle operator towards; determining one or more retargeted regions based on the target driver attention data; and for each retargeted region of the one or more retargeted regions, adjusting the visual display output for the retargeted region using an image adjustment technique and/or a graphic addition technique Various aspects disclosed herein may, as will be understood and appreciated in light of the foregoing discussion, overlap with one another and are not to be interpreted as having mutually-exclusive scopes, unless clearly provided for.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

A system and method is provided for retargeting a driver or vehicle operator's attention, particularly a visual attention of the vehicle operator, whereby a visual display output to be displayed for viewing by the vehicle operator is modified or otherwise adjusted in order to draw attention to particular portions, areas, or other regions of the visual display output to be displayed. More particularly, according to aspects of the disclosure, one or more target regions of the visual display output are identified and, thereafter, content of the target region(s) is modified so as to have a different appearance than before modification whereby the different appearance increases or decreases a likelihood that the vehicle operator will look at said content relative to appearance of said content before modification. Accordingly, there is disclosed techniques for drawing visual focus or attention of the vehicle operator toward or away from certain target regions within the content to be displayed.

According to an aspect of the disclosure, there is provided a method of retargeting attention of a vehicle operator or other vehicle operator, and this method includes: determining target driver attention data for the vehicle operator; and determining visual display output data representing visual display output as modified based on the target driver attention data for the driver. In at least some embodiments, the method further includes: determining current driver attention data for a vehicle operator, wherein the visual display output data is based on both the target driver attention data and the current driver attention data.

According to another aspect of the disclosure, the method of the last paragraph is implemented by a visual display output control system that includes at least one processor and non-transitory, computer-readable memory storing computer instructions that, when executed by the at least one processor, cause the visual display output control system to perform the method, thereby causing the visual display output to be adjusted according to the method and the resulting visual display output data to be displayed for viewing by the driver with an aim of increasing or decreasing the driver's attention toward the target region(s) of the visual display output.

Although the illustrated embodiment provided herein is detailed in regards to an automotive application, it will be appreciated that the visual display output control system and method are applicable to a variety of vehicular applications, including airplanes, boats or other marine vehicles, unmanned aerial vehicles (UAVs), etc. Accordingly, the discussion herein is not intended to be limited to automotive applications, unless clearly and unequivocally stated or otherwise provided for.

Figure 1:
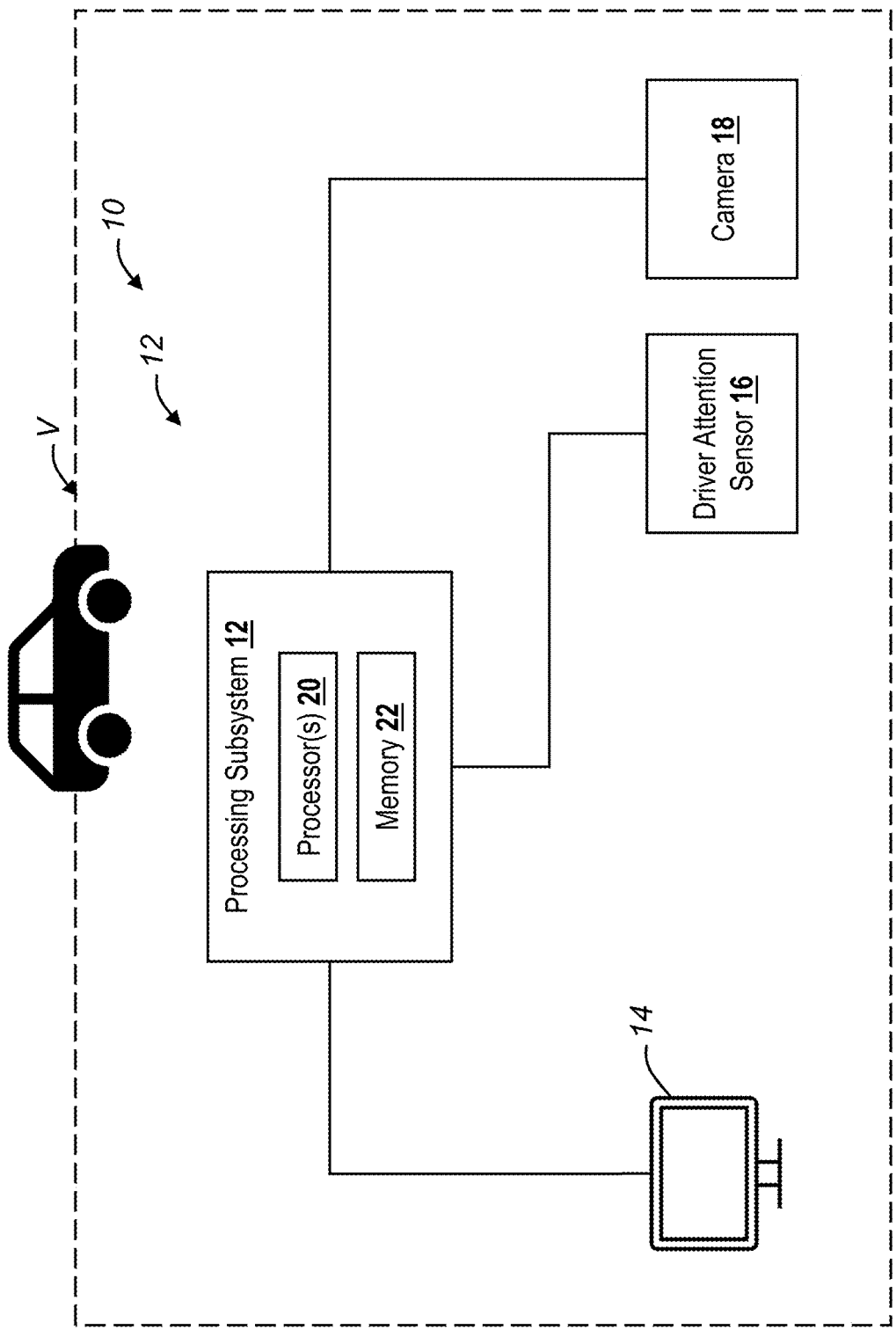
FIG. 1 is a block diagram illustrating a visual display output control system for a vehicle, which is used to retarget a driver's visual attention through making adjustments to a visual display output to be displayed on the display, according to one embodiment.

With reference to FIG. 1, there is shown a visual display output control system 10 having a processing subsystem 12, a visual display 14, a driver attention sensor 16, and a camera 18. The processing subsystem 12 is used to process a visual display output in order to adjust or modify the visual display output so as to increase or decrease attentiveness of the driver, particularly the visual attentiveness, to target regions of the visual display output. The visual display output control system 10 is incorporated into and installed on a vehicle V, which may be a passenger vehicle, such as a car, truck, sports utility vehicle (SUV), motorcycle, all tertian vehicle (ATV), boat, ship, other marine vehicle, airplane, unmanned aerial vehicle (UAV), other aerial vehicle, or other vehicle driven or operated by a person.

The processing subsystem 12 includes at least one processor 20 and memory 22 storing computer instructions that, when executed by the at least one processor 20, cause the functionality described herein attributed to the processing subsystem 12 to be performed. The processing subsystem 12 is configured to perform the method of retargeting attention of a driver or other vehicle operator, such as the method 200 described below. The processing subsystem 12 is installed on the vehicle V and is configured to send content to the visual display 14 so that the content, when displayed, is viewable by a driver or other operator of the vehicle V. The memory 22 is non-transitory, computer-readable memory and is accessible by the at least one processor 20 so that the at least one processor 20 is able to execute the computer instructions to thereby perform the method of retargeting attention of the driver or vehicle operator.

The visual display 14 is an electronic display that visually presents content to the driver or other operator of the vehicle V. The visual display 14 may be installed in a cockpit, passenger cabin, or other interior area of the vehicle V, and configured or arranged for viewing by the driver or operator when operating the vehicle V. The visual display 14 may be any of a variety of electronic displays, such as liquid crystal displays (LCDs), plasma displays, organic light emitting diode (OLED) displays, etc. In embodiments, the visual display 14 is an instrument panel or cluster display, an electronic display mirror, center console display, infotainment display, heads up display (HUD), etc. Accordingly, in embodiments, the visual display 14 is an electronic display with a display screen through which light is emitted (e.g., OLED, LCD) or may be an electronic display with a projector that projects light for display (e.g., HUD). The display screen of the visual display 14 or the space at which content is projected for visual viewing by the driver or vehicle operator is referred to herein as the display area. The visual display 14 is communicatively coupled to the processing subsystem 12 and is configured to receive visual display data from the processing subsystem 12 and to display said visual display data when received.

The driver attention sensor 16 is used for determining driver attention data indicating information about the driver's visual attention, such as a gaze direction (i.e., the direction in which the eyes are aimed or directed) and, in embodiments, identifying a particular location on the display area at which the driver is gazing or looking. In one embodiment, the driver attention sensor 16 is an eye tracking sensor and, in another embodiment, is a head tracking sensor. Furthermore, in embodiments, both an eye tracking sensor and a head tracking sensor are used in conjunction to determine the driver attention data.

In embodiments where the driver attention sensor 16 is an eye tracking sensor, the eye tracking sensor may be, for example, an infrared (IR), such as a near IR (NIR), sensor that is configured to obtain infrared sensor data indicative of the gaze direction of the driver. In one embodiment, the eye tracking sensor is an active IR sensor that projects IR light which reflects off an eye or eyes of the driver and said reflection is captured by a receiver or sensing element of the eye tracking sensor whereby sensor data is recorded and used for determining the gaze direction of the driver. As used herein, "IR" or "infrared" includes near-infrared (near IR), as well as mid-infrared (mid-IR) and far-infrared (far IR) radiation.

In embodiments where the driver attention sensor 16 is a head tracking sensor, the head tracking sensor may be, for example, a visible light camera that is configured to capture an image of a region in which the driver is situated when driving or operating the vehicle. This head tracking sensor data is then used to determine a direction the head of the driver is facing, which provides information that may be used with the eye tracking sensor data or in lieu of the eye tracking data for purposes of inferring or otherwise determining the gaze direction of the driver. It will be appreciated that other sensors for detecting, inferring, or otherwise determining driver attention data may be used.

The camera 18 is a device that has an image sensor for capturing image data representing an image, such as an image of an area or region exterior to the vehicle, for example. The camera 18 may be a visible light camera having a visible light sensor that is used to capture visible light image data representing visible light images or may be an infrared sensor configured to capture infrared image data representing infrared images, such as, for example, purposes of providing night vision. As used herein, a visible light sensor is a light sensor that captures visible light represented as an array of pixels that together constitute a visible light image. The visible light sensor is a camera that captures and represents a scene using a visible light color space or domain, such as RGB. According to embodiments, the visible light sensor is a digital camera, such as one employing a CMOS (Complementary Metal-Oxide-Semiconductor) sensor, CCD (Charge-Coupled Device) sensor, or Foveon sensor.

The camera 18 is installed on the vehicle and communicatively coupled to the processing subsystem 12 so as to provide image data to the processing subsystem 12. In embodiments, the camera 18 is used to capture a video feed and the video feed is communicated to the processing subsystem 12 whereby the processing subsystem 12 then processes and causes the processed video feed to be displayed on the visual display 14.

The camera 18 may be any variety of suitable camera types, such as digital single-lens reflex (DSLR) camera, mirrorless cameras, dash cams (e.g., Garmin Dash Cam 56™), compact digital cameras, pinhole cameras, etc. In one embodiment, the camera 18 is an exteriorly-facing camera. The exteriorly-facing camera is "exteriorly-facing" as the camera's field of view faces and captures an area outside of the vehicle, such as the road on which the vehicle is travelling, the skyline, and/or the sky. In embodiments, the visible light image data is also displayed for the driver or passenger of the vehicle, such as through displaying a live video stream of the visible light image data captured by the exteriorly-facing camera on the visual display 14.

While only a single visual display 14, driver attention sensor 16, and camera 18 are shown, it will be appreciated that the system 10 may include a plurality of visual displays, a plurality of driver attention sensors, and a plurality of cameras, such as a plurality of exteriorly-facing cameras, according to embodiments. And, of course, the system 10 may include various other vehicle electronics or other components, in embodiments.

Figure 2:
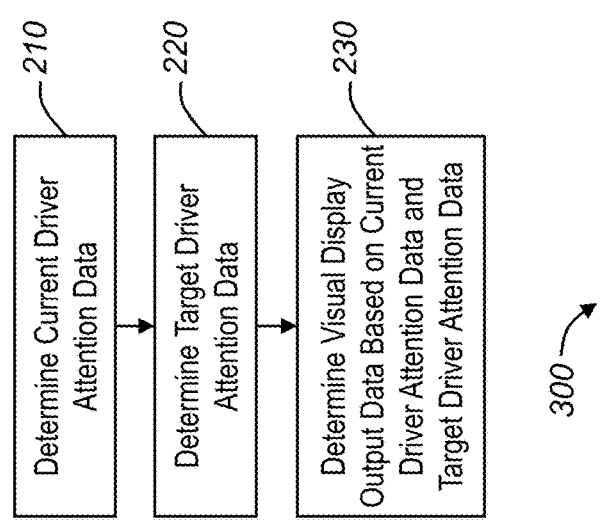
FIG. 2 is a flowchart illustrating a method of retargeting attention of a driver or other vehicle operator, according to one embodiment.
Figure 3:
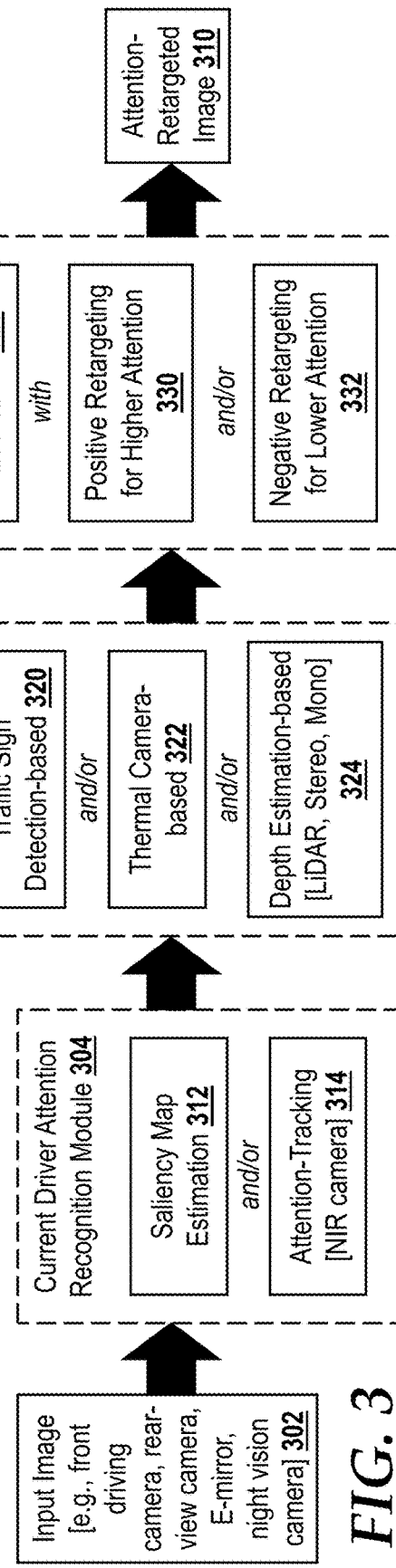
FIG. 3 is a block diagram and flowchart illustrating a visual display output retargeting system used to perform the method of FIG. 2, according to one embodiment.

With reference to FIGS. 2 and 3, there is shown a method 200 of retargeting attention of a driver or other vehicle operator (FIG. 2) along with a visual display output retargeting system 300 (FIG. 3) that is configured to perform the method 200, according to one embodiment. The method 200 is carried out by the visual display output control system 10, at least in one embodiment. While the steps of the method 200 are described as being performed in a particular order, it will be appreciated that the steps of the method 200 may be performed in any technically-feasible order, such as where step 220 is performed before or at the same time as step 210. Also, although the described and illustrated embodiment includes determining current driver attention data (step 210), in other embodiments, the step 210 is omitted and, in the step 230, the visual display output data is determined on the target driver attention data and not on any current driver attention data.

The visual display output retargeting system 300 is shown and described as an image output retargeting system 300 whereby an input image 302 is processed using a current driver attention recognition module 304, a target driver attention determination module 306, and a driver attention retargeting module 308 that operate together in order to generate an output image, referred to herein also as an attention-retargeted image 310. Each of the current driver attention recognition module 304, the target driver attention determination module 306, and the driver attention retargeting module 308 are implemented using software or computer instructions that, when executed by a processing subsystem such as the processing subsystem 12, cause each's attributed functionality to be carried out. The visual display output retargeting system 300 is included as a part of the visual display output control system 10 and its functionality performed by the processing subsystem 12, at least according to embodiments. While the operational or processing flow as indicated by the bold arrows of FIG. 3 illustrates a particular order in which processing may be performed, those skilled in the art will appreciate that such processing may be performed in any technically-feasible order or manner, such as where the processing of the target driver attention determination module 306 is operated simultaneously with or before the processing of the current driver attention recognition module 304.

The method 200 begins with step 210, wherein current driver attention data for a driver operating a vehicle is determined based on one or both of: sensor data captured at the vehicle and saliency map data. The current driver attention data is data indicating one or more of: an area or region of the visual display output for which the driver is presently or currently attentive towards; a gaze direction of the driver; and a head direction of the driver. In embodiments, the current driver attention data is obtained based on sensor data received at the vehicle V through attention tracking 314, which may be performed using eye tracking sensor(s) (as the driver attention sensor 16) capturing eye tracking sensor data and/or head tracking sensor(s) (as the driver attention sensor 16) capturing head tracking sensor data.

In some embodiments, the current driver attention data is determined based on saliency map data, and the saliency map data is determined saliency map estimation 312. The term "saliency," when used in connection with an individual's attention toward a visual display output, refers to an extent or degree to which said attention is or is expected to be drawn to a particular area or portion of the visual display output relative to other areas or portions of the visual display output. For example, given a first area having first content of a visual display output and a second area having second content of the visual display output, the first area is considered to be more salient or have a higher saliency value than the second area when the first content draws, or is anticipated or expected to draw (i.e., has a higher likelihood of drawing), more focus or attention from a viewer. Saliency of an area of the visual display output may be effected through various visual stimuli, including, for example, optical flow characteristics, movement, hue or color differences, contrast differences, color saturation, brightness, edge strength, luminance, or transient visual characteristics (e.g., flashing or blinking, an abrupt change in intensity or brightness).

In one embodiment, the saliency map data is determined based on initial visual display output data. The initial visual display output data refers to: data representing the visual display output prior to the making of adjustments to the visual display output in step 230; and/or data representing the visual display output displayed at a previous time, such as the time of a previous iteration of the method 200. The initial visual display output includes a camera feed whereby a series of images (video) is provided and may be streamed from the camera 18 for instant viewing (after any appropriate or desired image processing). Within an image of the camera feed, various objects or visual artifacts may be disposed, and visual information of said objects or artifacts is processed to identify a saliency value for each region of a plurality of image regions. For example, for each image region, a saliency value is determined and assigned thereto based on contrast of the image region, edge information within the image region, hue distinctiveness of the image region, texture distinctiveness of the image region, and frequency components of the image region.

In one embodiment, a spectral residual method is used for generating the saliency estimation map, such as the one set forth in Hou, Xiaodi, and Liqing Zhang. "Saliency Detection: A Spectral Residual Approach." 2007 IEEE Conference on Computer Vision and Pattern Recognition. IEEE, 2007. This spectral residual method is designed to emulate the pre-attentive stage of human visual processing without relying on prior knowledge of objects or features. Such a process starts with the computation of the log spectrum $\mathcal{L}(f)$ of a down-sampled image, capturing the inherent statistical properties of natural images that typically adhere to a 1/f law in their amplitude spectrum. The spectral residual $\mathcal{R}(f)$ is computed by subtracting the estimated average local spectrum A(f) from $\mathcal{L}(f)$, expressed as:

$$\mathcal{R}(f) = \mathcal{L}(f) - h_n(f) * \mathcal{L}(f)$$

where $\mathcal{L}(f) = \log(A(f))$, $$h_n(f) = \frac{1}{n^2}\begin{bmatrix} 1 & 1 & \ldots & 1 \\ 1 & 1 & \ldots & 1 \\ \vdots & \vdots & \ddots & \vdots \\ 1 & 1 & \ldots & 1 \end{bmatrix}, \text{ and}$$

$$A(f) = \mathfrak{R}(F[I(x)])$$

where A(f) represents the amplitude spectrum of image I(x), $\mathfrak{R}$ denoting the real part operator, and F denoting the Fourier Transform. The phase spectrum P(f) may be calculated using P(f)= $\mathfrak{I}$(F[I(x)]) with $\mathfrak{I}$ denoting the imaginary part operator.

The spectral residual is transformed back into the spatial domain using an inverse Fourier transform, followed by squaring the result to emphasize areas of highest novelty. This output is then smoothed with a Gaussian filter to produce the final saliency map. The transformations involved are captured in the equation:

$$S(x) = g(x) * F^{-1}[\exp(R(f) + P(f))]^2$$

where g(x) is a Gaussian filter (such as with σ=8), $F^{-1}$ represents the inverse Fourier transform, and P(f) is the phase spectrum of the image. The resulting saliency map S(x) effectively highlights proto-objects or regions of interest within the image. Additionally, the saliency map can be thresholded to create an object map, effectively segmenting the proto-objects from the background based on intensity thresholds. In other embodiments, other techniques for image saliency estimation may be performed to generate the saliency estimation map, such as, for example, using techniques set forth in S. Ryu, B. Ham and K. Sohn, "Contextual information based visual saliency model," 2013 IEEE International Conference on Image Processing, Melbourne, VIC, Australia, 2013, pp. 201-205, doi: 10.1109/ICIP.2013.6738042.

In some embodiments, the current driver attention data for the driver is determined based on both the sensor data of the driver attention sensor and the saliency map data. For example, the driver attention sensor, such as a NIR active sensor, 16 captures a gaze direction of the driver, which is indicative of an area of the visual display output that the driver is looking towards (this area is referred to as a "driver gaze display area"). Then, saliency map data of the visual display output is then inspected to provide further precision to the current driver attention determination through, for example, considering image regions of a displayed image that are within or proximate to the driver gaze display area. For example, the saliency values for said image regions are used to infer which particular area the driver is looking at. The method 200 continues to step 220.

In step 220, target driver attention data for the driver is determined. The target driver attention data is data indicating one or more target regions of a visual display output that is to be displayed to the driver. Each target region of the one or more target regions is an area or region of the visual display output that includes content for which it is determined to increase or decrease drawing of visual attention of the driver towards; that is, a target region is an area or region of the visual display output that is targeted for processing (as in step 230) in order to increase or decrease the visual attention given by the driver toward the area or region. The one or more target regions includes one or more positive target regions and/or one or more negative target regions. The one or more positive target regions are each a region of the visual display output for which it is determined to increase drawing of the visual attention of the driver towards. And, likewise, the one or more negative target regions are each a region of the visual display output for which it is determined to decrease drawing of the visual attention of the driver towards.

According to embodiments, the target driver attention data for the driver is determined based on sensor data and/or predetermined data, such as predetermined target region data. The target driver attention determination module 306 depicts various potential types of information that may be used to determine the target driver attention data, including: pre-defined (predetermined) target regions (or regions of interest (ROIs)) 316; visible light object-detection based data (captured by a camera) 318; traffic sign detection-based 320 (which may be considered a sub-type of the visible light object-detection based data 318 when performed using image data from a visible light camera); thermal camera-based data (such as through using an infrared (IR) camera, such as a far IR (FIR) camera) 322; and/or depth estimation-based data 324, which may be determined from LiDAR and/or radar data (either stereo or mono radar data).

The predetermined target region data includes: positive target region data that indicates one or more positive target regions of the visual display output; and/or includes negative target region data that indicates one or more negative target regions of the visual display output. Certain areas of the visual display output may be considered more important to the operation of the vehicle. For example, in automotive applications, a road region (a region of the visual display output having a road) is more important than other regions, such as the sky, buildings, and side regions. The road region may be predefined (predetermined) and based on a position and orientation of the field of view of the camera 18. In such an embodiment, the road region is considered a positive target region, particularly a predetermined positive target region in the present example, and peripheral portions toward the sky, for example, may be considered negative target regions or predetermined negative target regions in the present embodiment.

In embodiments, in addition to or in lieu of predetermined target region data, the target attention map is determined based on sensor information, such as sensor data captured by the camera 18 or other vehicle sensor, for example, radar or lidar for object detection and/or depth estimation of objects proximate the vehicle, thermal (or IR, such as an FIR) sensor or camera for object detection of objects proximate the vehicle, etc. In one embodiment, traffic sign detection is performed, such as through capturing image data using an exteriorly-facing camera along with image classification or other image processing technique enabling identification of a traffic sign, such as a stop sign or speed limit sign for road vehicles, within the camera's FOV.

In continuing with the pervious examples, object detection, such as traffic sign detection, can be used to determine the target attention map as pedestrians, cars, cracks, animals, and traffic signs are often of more importance such that the driver should pay more attention to such objects. The variant of object detection includes bounding-box object detection, pixel-wise object segmentation, and objectness estimation. Due to the ability to detect pedestrians, driving cars, and animals day/night regardless of weather conditions, a thermal camera output may also be used to determine the target attention map. Further, closer objects are often considered important such that the driver should pay attention to, and so such regions or areas can be identified as positive target regions. A depth sensor or depth estimation algorithm may also be used to estimate the distance of objects from the car or vehicle, which is used to determine the target attention map. Each set of information from the predetermined target region data, object detection, traffic signs, thermal camera, and/or depth estimation may be combined and used to determine the target attention map. The method 200 continues to step 230.

In step 230, visual display output data representing the visual display output as adjusted is determined based on the target driver attention data for the driver and the current driver attention data. Determination of the visual display output data includes making adjustments to the visual display output by adjusting target visual content of the one or more target regions of the visual display output so as to increase or decrease a likelihood of drawing the visual attention of the driver towards the one or more target regions of the visual display output.

In at least some embodiments, determining the visual display output data includes generating an attention retargeting map through attention retargeting map estimation 326 whereby an attention retargeting map estimation process is performed based on the current attention data and the target driver attention data. The attention retargeting map indicates the one or more retargeted regions with which to increase or decrease the visual attention of the driver. The one or more retargeted regions are determined based on the one or more target regions and, in embodiments, each retargeted region corresponds to a given one of the one or more target regions; however, in embodiments or implementations, it may be determined for one or more of the targeted region(s), after being processed with corresponding current driver attention data, that such targeted region(s) need not be adjusted and, accordingly, are not considered retargeted regions as no adjustment (retargeting operation) is performed for those target region(s) (e.g., region(s) or area(s) of the visual display output considered observable based on the gaze direction of the driver).

The attention map estimation retargeting process is used to estimate the attention retargeting map based on the difference between the driver's current attention map on the input image or visual display out, ac, and the desired target attention map, at. Based on the attention retargeting map, attention retargeting 328 is performed whereby the input image is processed to give greater attention to positive retargeted regions while giving lower attention to negative retargeted regions. Higher attention for positive retargeted regions (referred to as positive retargeting 330) is achieved by higher contrast, more texture details, attracting color, higher saturation, and/or in a more direct manner, such as through attracting patterns (e.g., flickering patterns) and/or arrows. Lower attention for negative retargeted regions (referred to as negative retargeting 332) is achieved by lower contrast, less-attracting color, lower saturation, blurring, and/or fading. Here, "image adjustment technique" refers to altering the appearance of an image or a part of an image to make it more visually appealing or to draw attention to certain areas. Such image adjustment techniques may include increasing contrast (e.g., making the difference between light and dark areas more pronounced), adding more texture details (e.g., enhancing the appearance of surface details), using attracting colors (e.g., colors that are particularly noticeable or pleasing to the eye), and/or increasing saturation (e.g., making colors more vibrant). Also, "graphic modification technique" refers to adding new visual elements to an image or display to draw attention or provide additional information, and this may include elements like arrows, symbols, or patterns (e.g., flickering patterns). These techniques are often used in a variety of fields such as graphic design, advertising, and user interface design to guide viewer's attention and improve user experience. In at least some embodiments, the input image 302 is itself processed using said image processing techniques and not through introduction of new or predetermined graphics, such as arrows or text. The method 200 then ends.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any of a variety of different electronic memory types and the particular type may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It will be appreciated that any one or more of the computers discussed herein may include other memory, such as volatile RAM that is used by the processor, and/or multiple processors.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of retargeting attention of a driver or other vehicle operator, comprising the steps of:
determining current driver attention data based on saliency map data and sensor data, wherein the sensor data is captured from a sensor that is installed on a vehicle and that is configured to captured the sensor data, wherein the saliency map data is determined based on processing each of a plurality of image regions of an image represented by the sensor data, wherein each image region of the plurality of image regions is assigned a saliency value based on contrast of the image region, edge information within the image region, hue distinctiveness of the image region, texture distinctiveness of the image region, and frequency components of the image region;
determining target driver attention data for a vehicle operator, wherein the target driver attention data indicates one or more target regions of a visual display output to be displayed to the vehicle operator, and wherein each target region of the one or more target regions is an area or region of the visual display output that includes content for which it is determined to increase or decrease drawing of visual attention of the vehicle operator towards; and
determining visual display output data representing the visual display output as adjusted based on the target driver attention data for the vehicle operator, wherein determining the visual display output data includes making adjustments to the visual display output by adjusting visual content of one or more retargeted regions of the visual display output such that, for each retargeted region of the one or more retargeted regions, a likelihood of drawing the visual attention of the vehicle operator towards the retargeted region is increased or decreased.

2. The method of claim 1, further comprising determining current driver attention data for the vehicle operator operating the vehicle based on one or both of: the sensor data captured at the vehicle by a driver attention sensor and the saliency map data, and wherein the current driver attention data indicates an area or region of the visual display output to which the vehicle operator is currently attentive towards.

3. The method of claim 2, wherein the visual display output data is adjusted based on the current driver attention data and the target driver attention data.

4. The method of claim 2, wherein the saliency map data is determined based on initial visual display output data, and wherein the initial visual display output data is data representing the visual display output prior to the making of adjustments to the visual display output.

5. The method of claim 4, wherein the sensor data includes image data representing an image captured by a camera, and wherein the saliency map data is determined based on processing each of the plurality of image regions of the image based on the image data.

6. The method of claim 2, wherein the current driver attention data is determined based on the sensor data, wherein the sensor data is data from a driver attention sensor installed on the vehicle and configured to capture the sensor data, and wherein the sensor data provides information pertaining to a state of the vehicle operator while the vehicle operator operates the vehicle.

7. The method of claim 6, wherein the driver attention sensor is an infrared (IR) sensor configured to capture information indicative of a gaze direction of the vehicle operator.

8. The method of claim 7, wherein the driver attention sensor is a device having an eye tracking sensor configured to capture eye information indicative of a gaze direction of the vehicle operator and/or a head tracking sensor configured to capture information indicative of a head position of the vehicle operator, and wherein the gaze direction of the vehicle operator is inferred or otherwise determined from the eye information and/or the head position of the vehicle operator.

9. The method of claim 1, wherein the target driver attention data is determined based on predetermined target region data, and wherein the predetermined target region data indicates one or more regions of the visual display output that are targeted for increased or decreased driver attentiveness.

10. The method of claim 1, wherein the one or more target regions includes one or more positive target regions, and wherein the one or more positive target regions are each a region of the visual display output for which it is determined to increase drawing of the visual attention of the vehicle operator towards.

11. The method of claim 10, wherein the target driver attention data is determined based on predetermined target region data, and wherein the predetermined target region data includes positive target region data that indicates the one or more positive target regions of the visual display output.

12. The method of claim 1, wherein the one or more target regions includes one or more negative target regions, and wherein the one or more negative target regions are each a region of the visual display output for which it is determined to decrease drawing of the visual attention of the vehicle operator towards.

13. The method of claim 12, wherein the target driver attention data is determined based on predetermined target region data, and wherein the predetermined target region data includes negative target region data that indicates the one or more negative target regions of the visual display output.

14. The method of claim 1, wherein the target driver attention data is determined based on sensor information captured by the sensor, and wherein the sensor information includes the sensor data or other sensor information.

15. The method of claim 14, wherein the sensor information includes image data captured by a camera or infrared (IR) sensor used as the sensor, and wherein at least one target region of the one or more target regions is identified as an area of an image to be displayed where the area of the image is identified through correspondence between a position of the area as the area exists within the image and a position within a sensor field of view of the sensor corresponding to the position of the area.

16. The method of claim 14, wherein the sensor information includes image data and/or depth information for one or more objects, wherein the one or more objects are used to determine the target driver attention data, wherein the image data is data that is processed to detect the one or more objects, and wherein the depth information indicates a distance for each of the one or more objects.

17. The method of claim 1, wherein determining the visual display output data includes generating an attention retargeting map based on the target driver attention data, wherein the attention retargeting map indicates the one or more retargeted regions with which to increase or decrease the visual attention of the vehicle operator, and wherein the one or more retargeted regions are determined based on the one or more target regions.

18. A visual display output retargeting system comprising: at least one processor; and memory storing computer instructions that, when executed by the at least one processor, cause performance of a visual display output retargeting process that includes:
- determining current driver attention data based on saliency map data and sensor data, wherein the sensor data is captured from a sensor that is installed on a vehicle and that is configured to captured the sensor data, wherein the saliency map data is determined based on processing each of a plurality of image regions of an image represented by the sensor data, wherein each image region of the plurality of image regions is assigned a saliency value based on contrast of the image region, edge information within the image region, hue distinctiveness of the image region, texture distinctiveness of the image region, and frequency components of the image region;
- determining target driver attention data for a vehicle operator, wherein the target driver attention data indicates one or more target regions of a visual display output to be displayed to the operator, and wherein each target region of the one or more target regions is an area or region of the visual display output that includes content for which it is determined to increase or decrease drawing of visual attention of the operator towards; and
- determining visual display output data representing the visual display output as adjusted based on the target driver attention data for the operator, wherein determining the visual display output data includes making adjustments to the visual display output by adjusting visual content of one or more retargeted regions of the visual display output so as to increase or decrease a likelihood of drawing the visual attention of the operator towards the one or more retargeted regions of the visual display output.

19. A method of retargeting attention of a driver or other vehicle operator, comprising the steps of:
- determining current driver attention data based on saliency map data and sensor data, wherein the sensor data is captured from a sensor that is installed on a vehicle and that is configured to captured the sensor data, wherein the saliency map data is determined based on processing each of a plurality of image regions of an image represented by the sensor data, wherein each image region of the plurality of image regions is assigned a saliency value based on contrast of the image region, edge information within the image region, hue distinctiveness of the image region, texture distinctiveness of the image region, and frequency components of the image region;
- determining target driver attention data for a vehicle operator, wherein the target driver attention data indicates one or more target regions of a visual display output to be displayed to the vehicle operator, and wherein each target region of the one or more target regions is an area or region of the visual display output that includes content for which it is determined to increase or decrease drawing of visual attention of the vehicle operator towards;
- determining one or more retargeted regions based on the target driver attention data; and
- for each retargeted region of the one or more retargeted regions, adjusting the visual display output for the retargeted region using an image adjustment technique and/or a graphic addition technique.

* * * * *